Jan. 19, 1954  K. W. HUNT  2,666,340
HANDGRIP
Filed March 29, 1950

INVENTOR.
KENNETH W. HUNT.
BY *Dybvig & Dybvig*
HIS ATTORNEYS.

Patented Jan. 19, 1954

2,666,340

UNITED STATES PATENT OFFICE 2,666,340

HANDGRIP

Kenneth W. Hunt, Dayton, Ohio, assignor to Hunt-Wilde Corp., Dayton, Ohio, a corporation of Ohio Application March 29, 1950, Serial No. 152,668

1 Claim. (Cl. 74—551.9)

This invention relates to a hand grip and more particularly to a safety hand grip of the type used on bicycle handle bars and the like.

Anyone investigating the various causes for bicycle accidents will find that many accidents have been caused by loose hand grips. The danger and inconvenience of loose hand grips has long been recognized and a large amount of research has been carried on over a period of years in an effort to solve this problem. Various solutions have been proposed from time to time, such as gluing the hand grips onto the handle bars and the like, but none have proven too satisfactory. The problem of gluing rubber onto metal has never been solved satisfactorily and consequently the bicycles being sold today do not have hand grips which stay on. It is an object of this invention to provide an improved hand grip which will stay on without the need for any glue or other complicated fastening means.

It has been discovered that hand grips made from elastomeric plastic material, such as polyvinyl chloride or polyvinyl chloride-acetate, possess the unexpected property of being easy to slide onto the handle bar, but once the hand grip is on, it cannot be removed by pulling or twisting on the hand grip.

Still another object of this invention is to provide a hand grip which is luminous in the dark so as to serve as a safety feature.

Another object of this invention is to provide a hand grip which feels good to the hand of the user.

Other objects and advantages reside in the construction of parts, the combination thereof and the mode of operation, as will become more apparent from the following description.

Figure 1:
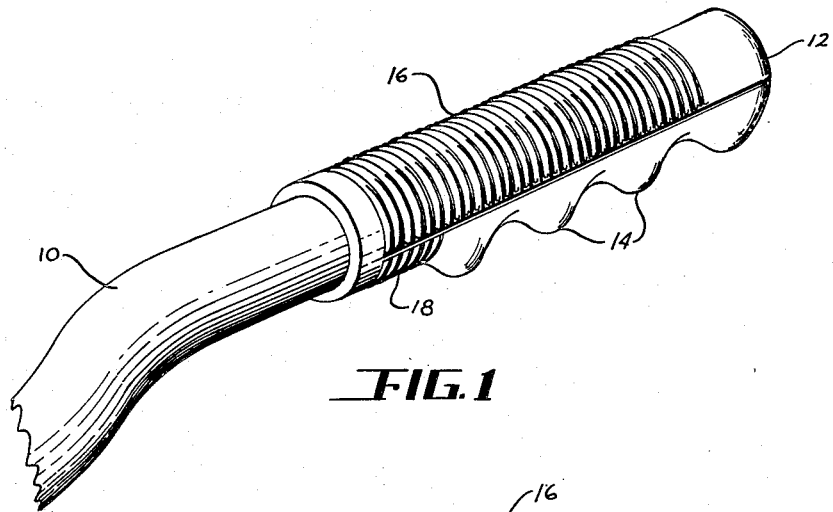
Figure 1 is a perspective view showing a hand grip constructed in accordance with my invention as applied to a handle bar.

For purposes of illustrating the invention, I have shown the hand grip applied to the handle bar of a bicycle, where as it is obvious that certain aspects of the invention are equally applicable to other types of mechanisms than bicycles. Thus, the hand grip shown herein could be used on such articles as wheelbarrows, steering levers for outboard motors, and various other types of uses wherein it is desired to provide a non-slip connection between a rigid member and a flexible member.

Referring now to the drawings wherein I have shown a preferred form and application of my invention, reference numeral 10 is intended to designate a conventional handle bar of a bicycle and reference numeral 12 designates an improved hand grip which telescopes over the end of the handle bar.

I have discovered that by making the hand grip out of a synthetic elastomeric plastic, such as polyvinyl chloride or polyvinyl chloride-acetate, the hand grip will readily slide onto the bar 10 just as easy or easier than conventional rubber hand grips of the type now used extensively, but once the plastic hand grip has been mounted on the handle bar, no amount of ordinary pulling or twisting will dislodge the hand grip from the bar.

The exact theory involved or the reason why the polyvinyl chloride or polyvinyl chloride-acetate hand grips act entirely different from the usual rubber hand grips made of vulcanized rubber is not definitely known. It is known that elastomeric plastics are capable of being molded in perfect detail and consequently they may be made with a perfectly smooth and dust free inside surface. Some individuals are of the opinion that the smooth inner surface produces somewhat of a Johanneson block effect and that this phenomena explains why a hand grip made from polyvinyl chloride defies removal in response to pulling or twisting forces applied to the hand grip. Another theory which has been advanced for the unexpected difference between ordinary hand grips made from rubber and hand grips made from elastomeric plastic of the type disclosed hereinabove is that the latter type of a plastic hand grip causes the well-known Chinese finger grip effect to come into play immediately when an attempt is made to remove the hand grip.

Figure 2:
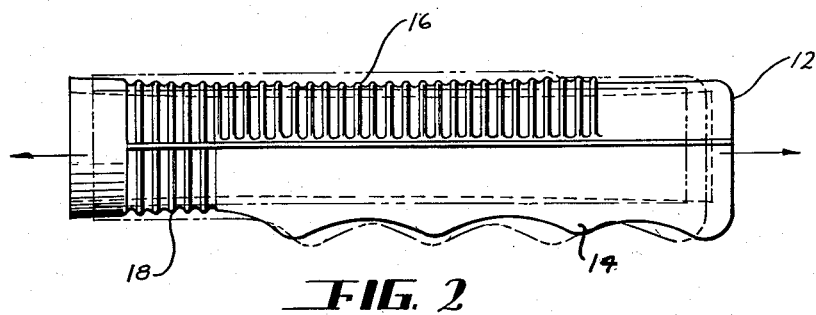
Figure 2 is a side elevational view intended to illustrate the change in shape which results from exerting a pull on one end of the hand grip when the other end is held against movement.
Figure 3:
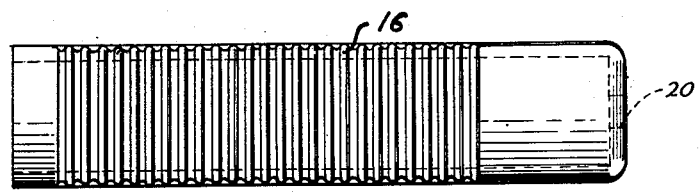
Figure 3 is a plan view of the hand grip.
Figure 4:
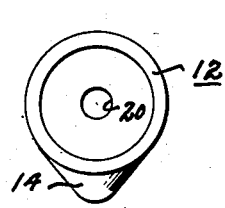
Figure 4 is a front end view of the hand grip.
Figure 5:
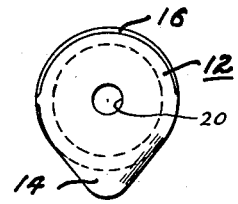
Figure 5 is a rear end view of the hand grip.

As best indicated in Figure 2 of the drawings, if a longitudinal pull is exerted on the material of the hand grip, the tendency will be for the internal diameter of the hand grip to be reduced and obviously any reduction in the internal diameter of the hand grip will serve to materially increase the frictional resistance between the inner surface of the grip and the outer surface of the bar on which the grip is mounted.

The dot-dash line showing in Figure 2 of the drawings is intended to represent the normal shape and size of the hand grip, whereas the full line showing is intended to designate the shape and size of the grip when an endwise pull is exerted on the grip. Obviously, the amount of change which has been shown in the internal diameter of the grip illustrated in Figure 2 could not take place if the grip were actually mounted on a rigid handle bar, but it shows in an exaggerated manner how a pull on the hand grip tends to cause the grip to have its internal diameter decreased so as to more firmly engage the handle bar.

It has been discovered that it is possible to remove a plastic hand grip by pushing against the extreme end wall of the hand grip. This pressure, however, must be exerted in a direction parallel to the central axis of the handle bar. It seems that a pressure of this type tends to increase the internal diameter of the plastic hand grip, with the result that such a pressure, and only such a pressure, serves to release the hand grip from the bar.

Projections 14 have been provided on the underside of the hand grip so as to improve one's grip thereon. The upper side of the hand grip has been corrugated, as indicated at 16, so as to improve the frictional resistance between the palm of one's hand and the hand grip. Likewise, the bottom side has been corrugated at 18 so as to further improve the frictional resistance between one's first finger and the bottom side of the hand grip. It has been found that longitudinally extending ribs or corrugations on a hand grip cause one's hand to become numb after prolonged engagement with the grip, whereas circumferentially extending corrugations do not have this same effect. It will be noted that the bottoms of the grooves between the corrugations are substantially in line with the smooth surface at the right hand end of the grip, as viewed in Figure 2, but that the tops of the corrugations are in line with the smooth surface at the other end of the grip.

A hole 20 is provided in the end of the grip so as to relieve the air pressure which would otherwise build up between the bar and the hand grip when the hand grip is shoved onto the bar.

One of the unobvious advantages of using polyvinyl chloride or polyvinyl chloride-acetate material for the hand grip is that these plastics can be made transparent whereby it is possible to add a phosphorescent material to the plastic and obtain a hand grip which glows in the dark. When using ordinary rubber or even synthetic rubber, the addition of phosphorescent material has very little, if any, effect due to the opaqueness of the rubber.

The preferred plasticizer to be used in formulating the elastomeric polyvinyl chloride or polyvinyl chloride-acetate hand grips is dioctyl phthalate, but other well-known plasticizers, such as esters of fatty acids, can be used. The hand grips are made to have approximately the same amount of elasticity as conventional vulcanized rubber hand grips. Thus, the Shore durometer hardness of the hand grip is preferably between 30 and 75.

Polyvinyl resins of the type used in manufacturing the hand grips disclosed herein are synthetic organic plastics derived from compounds having the vinyl ($-CH=CH_2$) group. The production facilities for making these polyvinyl resins make it possible to make the material very cheaply. The most common forms of polyvinyl esters or resins are polyvinyl acetate, polyvinyl chloride and copolymers of the monomeric esters which combine the best features of each. All of these polyvinyl ester resins are thermoplastic in nature and may be compounded with plasticizers which render the material pliable. Thus, the material can be made to resemble in many respects vulcanized rubber. Like rubber, it can be stretched, bent or otherwise deformed and will return to its original shape. Vulcanized rubber tends to return to its original shape quicker than most, if not all, elastomeric plastics, but the difference in rate of return is not a disadvantage in this case, since both materials stand up well in use. As pointed out hereinabove, the main advantage of the elastomeric plastics over vulcanized rubber is that the elastomeric plastic hand grips do not become loose on the handle bar, whereas the ordinary rubber type of hand grip quickly becomes loose.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

The combination of a handle bar or the like with a hand grip element, said handle bar comprising a metallic member having a smooth outer surface, said hand grip element comprising a tubular plastic member having a smooth inner cylindrical surface throughout the length of the tubular cavity, said hand grip element being telescoped over the end of the bar and arranged to frictionally grip the smooth surface, said plastic element being made from a plastic selected from the class consisting of a polyvinyl chloride and polyvinyl chloride-acetate copolymer, whereby the hand grip when mounted on the handle bar cannot be slipped off the bar by a pull axially and cannot be easily twisted.

KENNETH W. HUNT.

References Cited in the file of this patent

UNITED STATES PATENTS

| Number | Name | Date |
|---|---|---|
| 2,488,024 | Mudon | Nov. 15, 1949 |
| 2,618,986 | Hungerford | Nov. 25, 1952 |

FOREIGN PATENTS

| Number | Country | Date |
|---|---|---|
| 556,110 | France | July 12, 1923 |
| 719,126 | France | Feb. 2, 1932 |
| 832,882 | France | Oct. 4, 1938 |
| 857,500 | France | Sept. 14, 1940 |